United States Patent
Prival et al.

[15] 3,701,858
[45] Oct. 31, 1972

[54] MULTICHANNEL MAGNETIC HEAD UNIT OF LAMINATED CONSTRUCTION

[72] Inventors: Guy Prival, Chilly Mazarin; Lucien Robert Prieur, Ecouen, both of France

[73] Assignee: Societe Industrielle Bull-General Electric (Societe Anonyme), Paris, France

[22] Filed: Aug. 10, 1970

[21] Appl. No.: 62,525

[30] Foreign Application Priority Data

Aug. 14, 1969 France..................6927994

[52] U.S. Cl..........................179/100.2 C, 29/603
[51] Int. Cl..........................G11b 5/16, G11b 5/42
[58] Field of Search...............179/100.2 C, 100.2 P; 340/174.1 F; 346/74 MC

[56] References Cited

UNITED STATES PATENTS

| | | |
|---|---|---|
| 2,769,036 | 10/1956 | Selsted................179/100.2 C |
| 3,351,925 | 11/1967 | Lammeren et al. ..179/100.2 P |
| 3,042,753 | 7/1962 | Iwamura..............179/100.2 C |
| 3,441,884 | 4/1969 | Eppe....................179/100.2 C |
| 2,923,779 | 2/1960 | Namenyi-Katz ....179/100.2 C |
| 3,486,220 | 12/1969 | Braun et al..........179/100.2 C |
| 3,545,077 | 12/1970 | Suzuki et al.........179/100.2 C |
| 3,185,971 | 5/1965 | Brette et al. ........179/100.2 C |
| 3,523,285 | 8/1970 | Alger et al...........179/100.2 P |

Primary Examiner—Bernard Konick
Assistant Examiner—Robert S. Tupper
Attorney—Baldwin, Wight & Brown

[57] ABSTRACT

A multichannel magnetic transducer, wherein each of a plurality of aligned magnetic heads comprises a plurality of composite laminations, the composite laminations forming a magnetic circuit and electric and magnetic shields; and the process for fabrication of the transducer.

8 Claims, 12 Drawing Figures

PATENTED OCT 31 1972 3,701,858

INVENTORS
Guy Prival
and
Lucien Robert Prieur
BY Baldwin, Wight & Brown
ATTORNEYS INVENTORS
Guy Prival
and
Lucien Robert Prieur BY Baldwin, Wight & Brown

ATTORNEYS

MULTICHANNEL MAGNETIC HEAD UNIT OF LAMINATED CONSTRUCTION

BACKGROUND OF THE INVENTION

This invention relates to improved multichannel magnetic head units utilized in cooperation with a movable magnetizable medium, either for writing of data on the medium, or for reproducing or reading data from the medium. Preferably, the magnetizable medium constitutes one face of a magnetic disc, which can be mounted in fixed or removable manner in a magnetic disc apparatus.

In order to make best use of the surface of these magnetic discs, research continuing to provide high density recording, not only in the longitudinal direction of the disc; i.e., along the direction of each magnetized track, but also in the transverse direction. This latter improvement is manifested by a reduction in the width of the magnetized tracks and by their reduced separation. This reduction in dimensions of the magnetized tracks is quite obviously reflected in the dimensions of the magnetic heads, which are disposed side-by-side to provide a number of channels equal to the number of tracks required to be served in one transducing operation (writing or reading).

It is known that when magnetic heads are disposed very close to each other it is necessary to take measures to counteract the effects of the cross-talk or of the coupling between conductors. That is why the shield elements of conductive or magnetic metals are inserted between the magnetic heads, which themselves are constituted of laminations of a ferromagnetic metal, such as mumetal.

Therefore, it is the object of this invention to provide a multichannel magnetic head unit for employment with a high density magnetic recording medium.

In apparatus of this type, wherein the various sheets forming the so-called magnetic head, laminations, as well as the intermediary shields, constitute planes of a generally rectangular outline corresponding to the cross-section of the multichannel head unit, then, according to the instant invention, these planes can be composites. For example, in a plane forming a part of a magnetic circuit, one portion of mumetal constitutes the magnetic element and another portion of electrically conductive metal constitutes the shield element. Thus, the effectiveness of the shielding is enhanced.

On the other hand, since the miniaturization of the pieces utilized affects both the external dimensions and the thickness of the laminations, it is necessary to facilitate the connections to the transducer coils while assuring their electrical isolation relative to the neighboring laminations. Accordingly, some shield planes comprise a portion of conductive metal and a portion of insulating material.

According to a first aspect of the instant invention, there is provided a multichannel magnetic head unit of which the heads are stacked one beside the other to correspond to the parallel or concentric tracks of a movable magnetizable medium. Each head comprises two half-heads, between which is provided an air gap. Each half-head is formed of a stack of sheets of various materials oriented parallel to the direction of the tracks. In each of the heads, the half-heads are composed of several "planes" of very nearly identical exterior outline, some of the planes being constituted of two portions of the same thickness but of different materials; for example: (1) ferromagnetic material and conductive shielding material, (2) ferromagnetic material and insulating material. In each head at least one half-head comprises three composite planes in which the magnetic material portion comprises a branch adapted to receive a transducer coil.

The external shield planes comprise several portions, either entirely of conductive metal or of conductive material and insulating material. In the planes which are entirely of conductive metal, one portion is utilized as a connection plate for a wire of a transducer coil.

It is apparent that if half-heads of the type defined above are individually fabricated by conventional methods, the fabrication will be extremely delicate and costly because of the necessity of manipulating and of positioning pieces of very small dimensions while attempting to obtain very high precision.

Therefore, another object of the invention is to provide an improved process for fabricating magnetic head units.

Another object of the instant invention to provide a fabrication process for a multichannel magnetic head unit which is relatively economical, by virtue of the simultaneous fabrication of a large number of magnetic head elements.

In the process of the instant invention, individual manipulations of the components are reduced by all measures possible. The only individual operations which remain are the mounting of each coil on a branch of its magnetic circuit and the soldering of the wires of the coil to the connection plates, to the extent that it is necessary to solder with tin and there is no recourse to electric machine soldering, although this is similarly possible.

Consequently, according to the invention, the process of fabrication of a unit of magnetic transducer heads composed of laminations of different materials comprises:

a. preparing, by photoetching or chemical attack and imbrication, sheets with cutout patterns of different types intended to form the elements necessary for M sets of N pairs of half-heads, which include at least;
  i. one composite sheet of a first type comprising M×N pairs of elements of a magnetic metal of high permeability and M×N pairs of elements of a conductive metal,
  ii. two composite sheets of a second type each comprising M×N pairs of elements of a magnetic metal and M×N pairs of elements of an insulating material,
  iii. two sheets of a third type each comprising M×N pairs of elements of a conductive metal wherein an element may comprise two separate portions, and
  iv. two sheets of a fourth type each comprising M×N pairs of elements of a conductive metal;

b. forming a lamination of magnetic circuits by juxtaposition and bonding of a composite sheets of the first type between two composite sheets of the second type;

c. mounting a transducer coil on each of the separate portions of the magnetic circuits;

d. assembling, by juxtaposition and bonding, a sheet of the third type on each face of the lamination;

e. soldering to one of the separate portions of the elements of the sheets of the third type a wire of a corresponding coil;

f. assembling, by juxtaposition and bonding, a sheet of the fourth type on each face of the lamination obtained previously, and g. separating, by sawing, M×N pairs of the half-heads as parallelepipeds.

Preferably, having mounted the coils on their legs of the magnetic circuit, the next step can be the separation, by cutting, of the portions of the soldering plates from the sheets of the third type and their bonding onto appropriate positions on the faces of the magnetic circuit laminations. This permits soldering the wires of the coils immediately after being mounting on their magnetic circuit branches; i.e., before the assembling of the sheets of the third type. Following this, the sequence of the operations continues unchanged.

For the construction of a multichannel magnetic head unit, it is necessary to prepare composite sheets of a fifth type, for use as separation shields. The elements of this fifth type composite sheets are each composed of two portions; namely, one portion of conductive metal and one portion of insulating material.

A multichannel unit according to a first embodiment is formed by assembling and bonding as many magnetic laminations as there are channels to be provided, and by inserting in the required order sheets of the third, fourth and fifth types. In a multichannel unit according to a second embodiment the number of channels are only half the number of magnetic laminations utilized.

Another advantage resulting from the fabrication process of the invention arises from the fact that from the same components and a practically identical mode of fabrication, there can be obtained either a multichannel unit in which (first embodiment) each magnetic head only comprises a single coil and the spacing of the heads is $p$, or a multichannel unit in which (second embodiment) each magnetic head comprises two coils capable of being connected in different manners, and the spacing of the heads is $P=2p$.

BRIEF DESCRIPTION OF THE DRAWING

The invention will be described with reference to the accompanying drawing, wherein.

DESCRIPTION OF THE PREFERRED EMBODIMENT

According to the preferred application of the invention, the multichannel magnetic head unit is intended to be mounted in known manner in an articulated flying shoe which is flexibly supported to permit the face of the head that cooperates with the magnetizable surface of a magnetic disc to be suitably held in immediate proximity to such surface. The distance between the two surfaces is maintained constant by a film of air carried along with the rotating disc. The flying shoe can also efficiently support a plurality of heads. Because the faces of the magnetic heads are not normally in contact with the surface of the disc it is not necessary to protect them against wear, so that a certain simplification of construction results.

Figure 1:
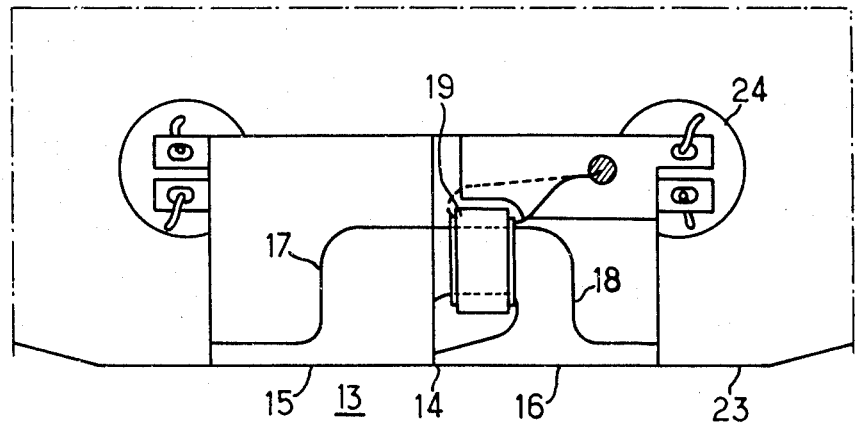
FIGS. 1 and 2 are, respectively, an end view and a view from below of a first embodiment of a magnetic head unit of the invention.

FIG. 1 shows a magnetic head unit 13, in accordance with a first embodiment in which a magnetic head comprises only a single transducer coil. This unit comprises a front portion 15 and a rear portion 16, separated only by a plane air gap 14. Air gap 14 constitutes a thin film of a polyester such as polyethylene terephthalate (mylar) of a thickness of 3 microns, for example. Although magnetic head portions 15 and 16 are in reality separated by a thin spacing material, it is customary to term this separation space an "air gap" because it has effectively the permeability of air.

The external shields at the end of the head unit are shown as being removed in FIG. 1. A magnetic head is composed essentially of a magnetic circuit element 17 for a half-head A, and a magnetic circuit element 18 for a half-head B. Element 18 has the form of a horseshoe, lengthened by a spur, and has one branch adapted to receive a transducer coil 19. Coil 19 is formed conventionally by a winding of copper wire on an insulating frame.

Head unit 13 is mounted in a support 23, which can be the above-mentioned flying shoe. Flying shoe 23 comprises a socket in which head unit 13 is held, and two slots 24 of circular cross-section for the passage of conductors for connecting to the coils.

Figure 2:
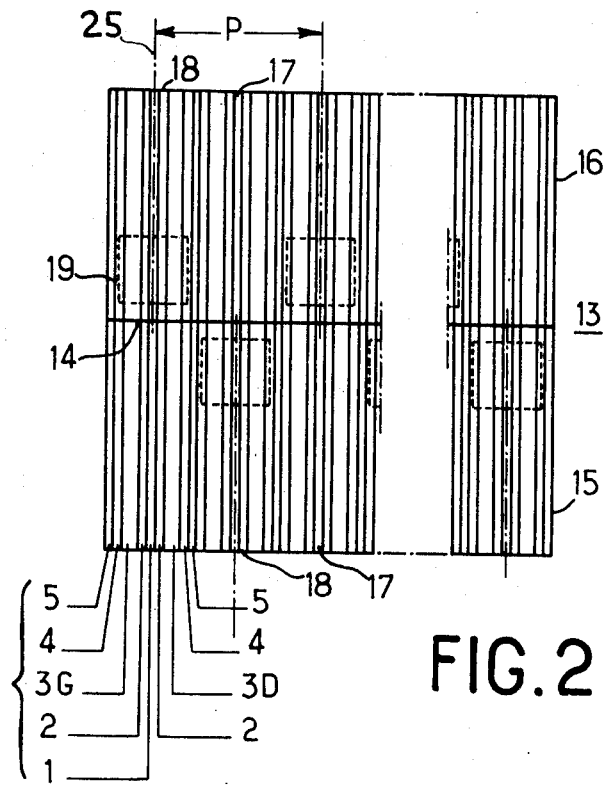

In FIG. 2, head unit 13 is viewed from below. An axis of symmetry 25 is represented toward the left of the figure. Each head is composed of a stack of thin sheets of appropriate material, which are termed "planes" and to which have been assigned reference numerals according to the position of these planes relative to axis of symmetry 25. Thus, the axis of symmetry 25 is found in plane 1. To the left of plane 1 is a plane 2, then a plane 3G, and finally a plane 4. To the right of plane 1 is similarly found a plane 2, then a plane 3D, and finally a plane 4. At each end of the head unit is provided a plane 5. A plane 5 is likewise disposed between two successive magnetic heads. It will be seen in more detail hereinafter that all of the planes of adjacent half-head elements are bonded together by means of a cement forming very thin sheaths between the planes.

In the embodiment of for more than two magnetic heads, magnetic circuits are inverted; i.e., successive transducer coils 19 are disposed alternately in a unit portion 16 and in a unit portion 15, on both sides of the plane air gap 14. According to one example of the embodiment, the thickness of the planes are such that coils 19 are separated by a spacing $P=1.16$ mm in each of the unit portions of the head, so that the actual spacing $P=P/2$ of the magnetic heads is 0.508 mm.

Figure 3:
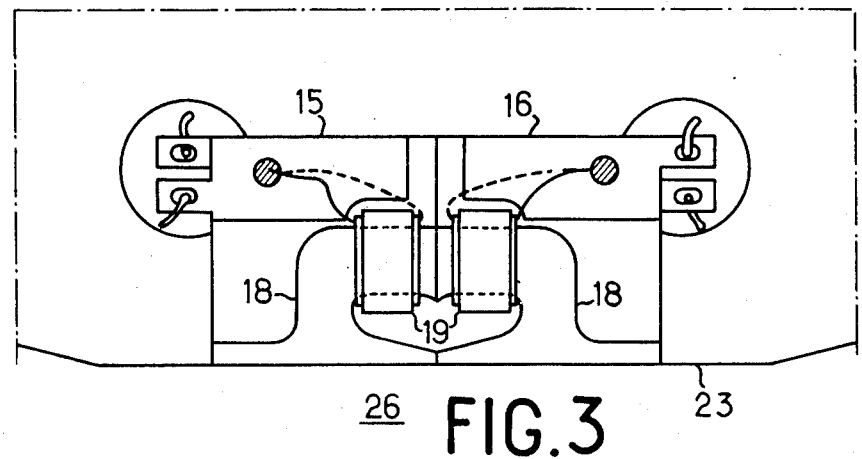
FIGS. 3 and 4 are, respectively, an end view and a view from below of a second embodiment of a magnetic head unit of the invention.
Figure 4:
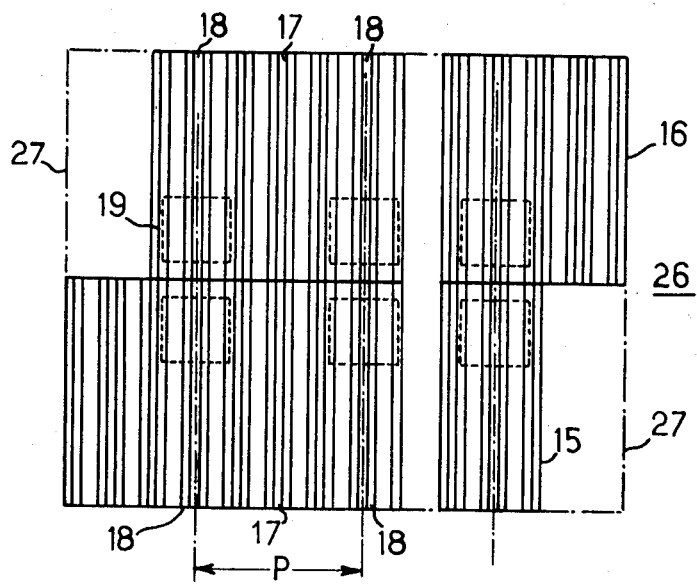

One feature of the invention resides in the capability of constructing, with the same elements as those described above, a magnetic head unit in which each magnetic head is provided with two transducer coils and wherein the actual spacing between adjacent magnetic heads is 1.16 mm. This embodiment can be seen in FIGS. 3 and 4. Such head unit 26 can be mounted in the same flying shoe 23. Each magnetic head comprises two magnetic circuit elements 18, each bearing a coil 19. FIG. 4 shows that the head unit portions 15 and 16 are formed in the same manner as those in the first embodiment of FIGS. 1 and 2, and that is sufficient to provide a translation of portion 15 relative to portion 16, for distance $p = 0.508$ mm, to obtain the second embodiment. The magnetic circuit elements 17 are again provided, but their role in this embodiment is to complete the shielding between adjacent magnetic heads.

In order to restore the parallelepiped form of the head unit, one solution may consist of cementing a block addition, such as block 27, to each end of the head unit. Another solution may consist of evening the end by sawing or milling the parts extending past the opposed ends of portions 15 and 16.

FIGS. 5 – 8, show in detail the construction of the different composite planes. The magnetic elements are fabricated from a thin sheet of metal of high permeability, such as mumetal. The shield elements are made of a good conductive metal which may be copper, but which is preferably beryllium-bronze. The insulating elements are obtained from a thin sheet of polyethylene terephthalate, such as mylar.

Figure 5:
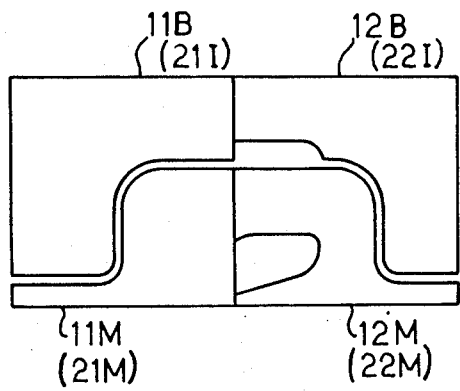
FIGS. 5 – 8, are detailed views of different lamination elements employed in the head units of FIGS. 1 – 4.

In FIG. 5, the patterns shown are applicable to both planes 1 and 2. Plane 1 comprise two magnetic elements 11 M and 12 M, both of a thickness of 0.05 mm, of which the patterns correspond to those shown in FIG. 1. In addition, plane 1 comprises two shield elements 11 B and 12 B. A certain space is provided between the adjacent parts of elements 11 B and 11 M on the one hand, and elements 12 B and 12 M on the other hand. A cutaway is provided in element 12 B for the passage of the coil.

Plane 2 comprises two magnetic elements 21 M and 22 M, of 0.05 mm thickness, of which the patterns are the same as those of respective elements 11 M and 12 M. In addition, plane 2 comprise two insulating elements 21I and 22I. These insulating elements which have the same patterns as those of respective elements 11 B and 12 B, are of mylar of 0.05 mm thickness.

Figure 6:
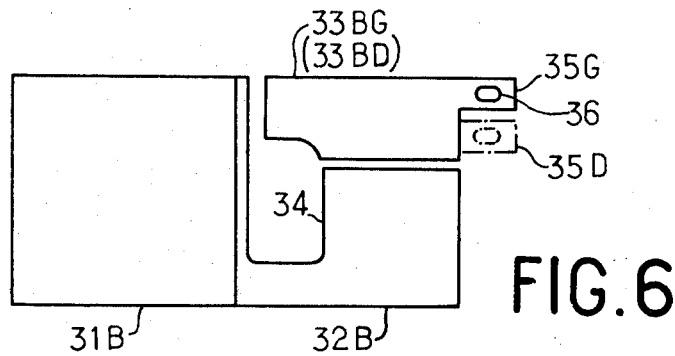

In FIG. 6 are shown the external shield elements of planes 3G and 3D, which are of bronze of 0.1 mm thickness. These planes comprise an element 31B of rectangular form, and element 32B, and an element 33BG or 33BD. Element 32 B is provided with a slot 34 to accommodate a coil 19. In addition to their role as conductive shields, elements 33BG and 33BD are utilized for soldering to the connecting leads of a coil 19, as can be seen in FIGS. 1 and 3.

Figure 9:
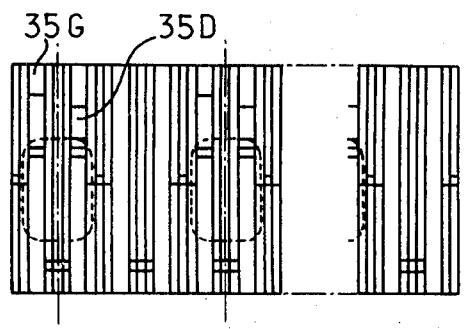
FIG. 9 is an elevational view of the magnetic head unit of FIGS. 1 and 2.

The right portion of each of elements 33BG and 33BD is extended as a respective soldering tab 35G and 35D, each such tab being provided with an oblong hole 36. Because tabs 35G and 35D extend beyond the rectangular outline of the cross-section of the respective head unit portions 16 and 15, soldering the connecting leads of a coil to these tabs is facilitated, as can be seen in FIGS. 1 and 3. Planes 3G and 3D differ only in the relative height of respective tabs 35G and 35D, as seen in FIG. 9.

Figure 7:
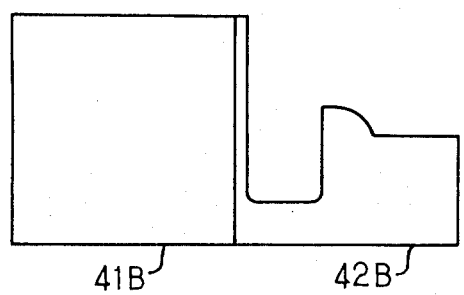

Plane 4, employed as a thin external shield, FIG. 7, comprises elements 41B and 42B. Element 42B has a slot of the same shape as slot 34 of element 32B. Elements 41B and 42B are of bronze of 0.05 mm thickness.

Figure 8:
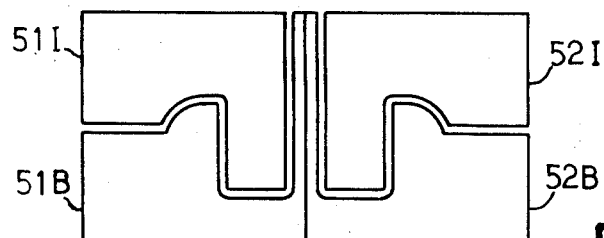

Plane 5, employed as a separation shield, FIG. 8, comprises elements 51B and 52B of bronze of 0.05 mm thickness, and elements 51I and 52I of mylar of 0.05 mm thickness. Elements 51B and 52B are symmetrical and their patterns are the same as that of element 42 B. The lower parts of elements 51I and 52I extend into the slots of respective elements 51 B and 52B in order that the side portions of coils 19 do not make contact with a metallic member.

If it is desired to reduce the weight of the magnetic head unit holes may be made, for example circular or otherwise, in the bronze shield elements which have been described above. These holes provide the further advantage of improving the mutual adhesion of the bonded elements.

It is an advantage of the invention to provide the economical realization of a multichannel magnetic head unit wherein the elements are both relatively complex and of small size. For this, it is contemplated to fabricate the elements of the magnetic heads and the shields a large number of times, Q, wherein Q is equal to or greater than 100.

The basic concept is to produce the components of the magnetic head unit from sheets of appropriate materials and thickness by the well-known processes of photoetching or chemical attack. Thus, a certain number of sheets comprising patterns cutout according to the outlines of the desired elements are prepared, these patterns being augmented by an increased size for subsequent machining. The number of sheets prepared depends on the number of channels to be provided in the magnetic head unit to be fabricated. This preparation is followed by the superposition, with selected imbrication, of the cutout sheets and their bonding in suitable assembling fixtures. Subsequent operations take place, as will be described in detail hereinafter, and finally there is provided the process for separating the Q head units by sawing or milling, as well as a last step for assuring required dimensioning and surface states.

Figure 10:
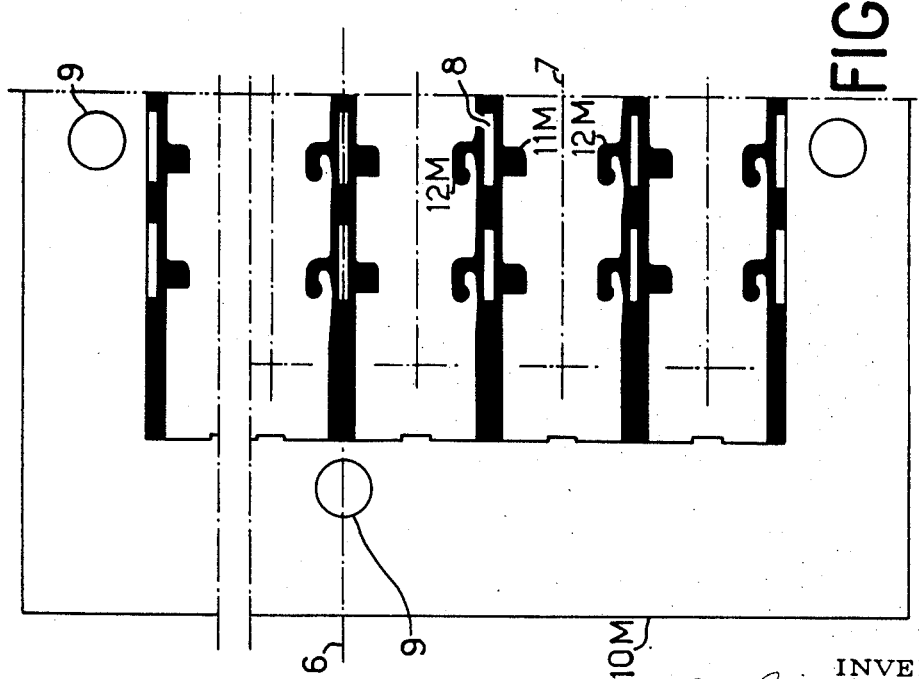

Referring now to FIG. 10, a sheet 10M is shown, in which are cutout the patterns for forming elements 11M and 12M of planes 1. In the vertical direction are provided a number M, for example $M = 6$, of sets of patterns symmetrically disposed relative to the general axis of symmetry 6. Each set of patterns may comprise a number N, for example $N = 17$, of patterns only two patterns being shown per set. The right side, not shown, of sheet 10M is analogous to the left side. The M×N cutout patterns is sheet 10M correspond to $Q = 102$ magnetic heads, or more precisely to 102 magnetic head units.

In each set of patterns, the elements 11M and 12M are disposed at equal distances from a design axis of symmetry 7. Two adjacent elements 11M and 12M are separated by a rectangular slit, such as slit 8, which defines the path of the saw at the time of separation of the head unit blocks. Sheet 10M, of mumetal, is provided with positioning holes 9 in positions which correspond to guides or pins of the assembling fixture. Elements 21M and 22M of plane 2 are similarly obtained from sheets 10M.

Figure 11:
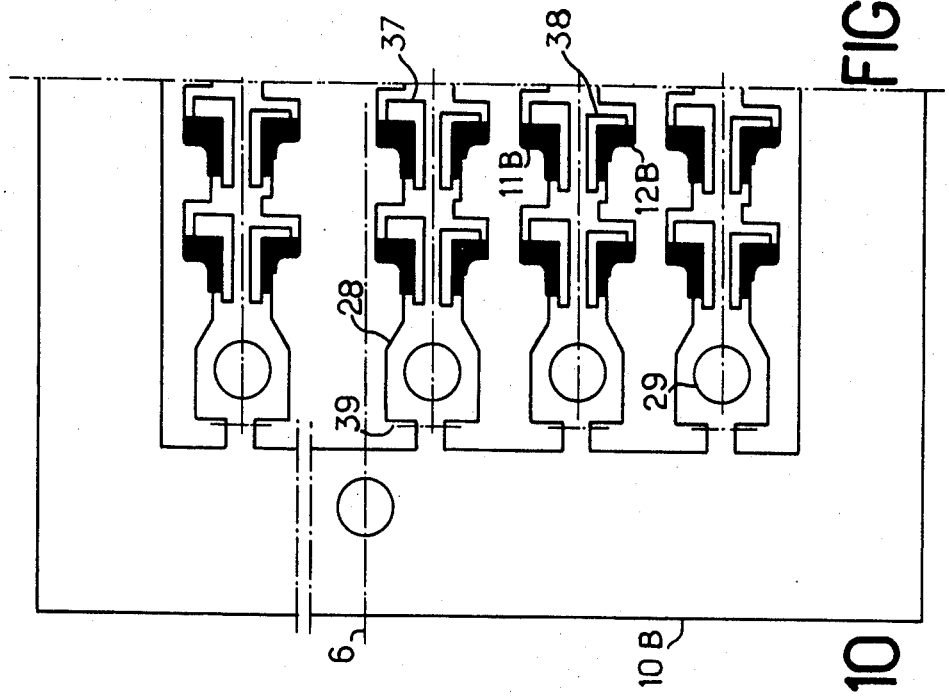
FIGS. 10–12 are views of the cutout patterns of some of the sheets prepared for assembling a multichannel unit.

FIG. 11 illustrates a sheet 10B, of bronze, in which are cutout the patterns for forming elements 11B and 12B of planes 1. The number and the arrangement of these patterns are established to correspond with those of sheet 10M. The photoetching leaves six strips 28, with a hole 29 at each of their ends. Openings 37 and 38 provide for the passage of the saw.

The exterior border of sheet 10B is eliminated when the six strips 28 are cut at line 39. After placing a sheet 10M on the assembling fixture, the six strips 28 are placed on the fixture, these becoming imbricated between the elements 11M and 12M in the same plane as that of sheet 10M. Each of strips 28 is positioned by a pair of positioning pins of the assembling fixture.

Elements 21I and 22I for planes 2 are provided from a sheet 20 I, in which that patterns have the same outline as those of sheet 10B, FIG. 11. The operations for repeating these elements are slightly different because of the fact that there is utilized, in this instance, a sheet of mylar, of 0.05 mm thickness, covered on its two faces with a layer of copper. One copper face having been coated with a layer of photosensitive resin, termed "photoresist," the layer is exposed to light through a mask (similar to that employed for sheet 10B). The exposed layer is then developed and selectively dissolved. Next, the corresponding layer of copper is chemically etched in the usual manner, leaving patterns of copper above the elements of mylar to be retained. The composite sheet is thereupon immersed in a bath of dilute sulfuric acid, which only dissolves the unprotected mylar and does not attack the copper. There only remains then the dissolution of the copper remaining on the two faces of the sheet by a normal etching bath to obtain patterns of mylar identical to the patterns represented in FIG. 11.

Figure 12:
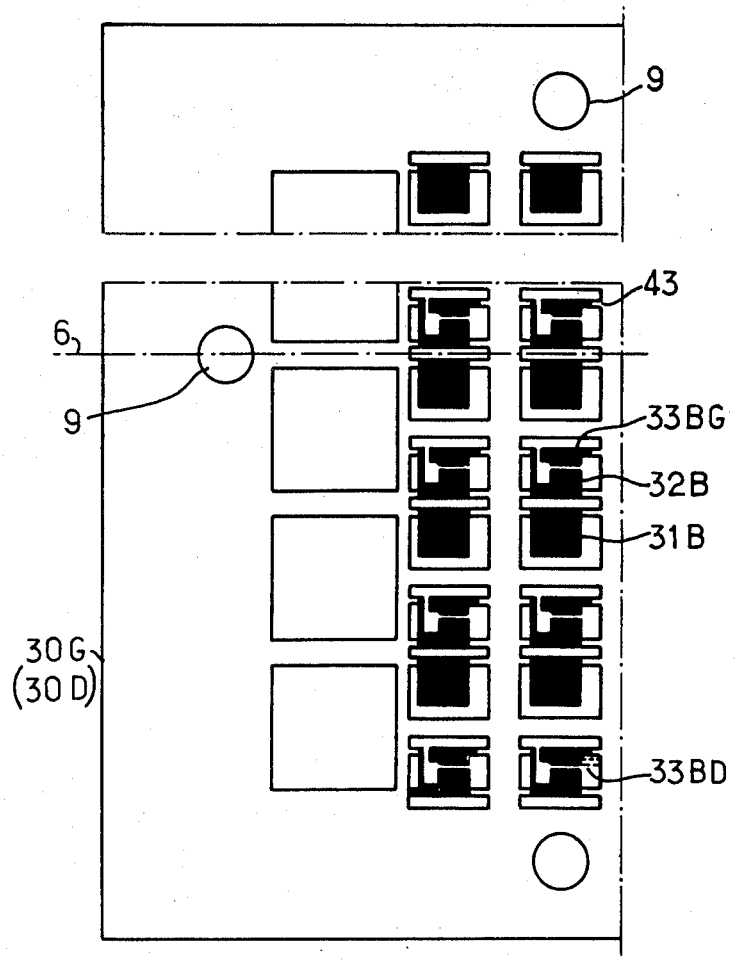

FIG. 12 illustrates a sheet 30G, of bronze of 0.1 mm thickness, in which cutout the patterns for forming elements 31B, 32B and 33BG of planes 3G. Sheet 30D differs from sheet 30G only in the form of element 33BD, which is represented by dashed lines to illustrate the difference in height of soldering tabs 35G and 35D, FIG. 6. Before assembly, elements 33BG and 33BD are individually separated from the remainder of sheets 30G and 30D respectively, by cutting their connecting strips at points such as that shown by reference numeral 43.

It is not necessary to provide a drawing of the cutout patterns in sheet 40B, which is of bronze of 0.05 mm thickness and which provides elements 41B and 42B, since the conception of these patterns is analogous to that which has been described previously. Similarly, a drawing has not been provided for sheet 50B, which is of bronze of 0.05 mm thickness and which provides elements 51B and 52B, or for sheets 50I, which is of mylar of 0.05 mm thickness and which provides elements 51I and 52 I. Six strips of mylar patterns must be obtained from a sheet 50I for imbrication into the same plane as that of a sheet 50B, in the same manner as that which has been described relative to sheets 10M and 10B.

In summary, if the number of channels provided in a multichannel magnetic head unit is designated by the symbol X, the minimum quantities of sheets of elements to be prepared are: 3X sheets 10M, X sheets 10B, 2X sheets 20I, X sheets 30G, X sheets 30D, 2X sheets 40B, X+1 sheets 50B, and X+1 sheets 50 I. In order to realize this set of sheets, seven different masks in all are required.

When the sheets of elements of mumetal, of beryllium-bronze, and of mylar have been prepared in the manner indicated above, the fabrication of 102 multichannel head units proceeds.

The following describes a process for the fabrication of X sets of magnetic heads, for each of these sets the fabrication proceeding according to the following operations:

a. Positioning on an assembling fixture and bonding with a cement of the "epoxy" type a sheet 10M (for elements 21M and 22M) with imbrication of six strips of mylar patterns (for elements 21I and 22 I), then a sheet 10M (for elements 11 M and 12M) with imbrication of six strips of bronze patterns (elements 11B and 12B), and finally another sheet 10M, with imbrication of six mylar strips. Each set is removed from the fixture after drying.

b. Positioning and bonding individually the soldering plates 33BG and 33BD previously separated from sheets 30G and 30D as described above, the plates 33BG being bonded to one face of each set of magnetic heads at appropriate locations and the plates 33BD being similarly bonded to the other face.

c. Mounting individually the transducer coils on the branches of the magnetic circuits of the half-heads B of the set.

d. Soldering the ends of the wires of the coils to the corresponding soldering plates.

The process next provides for assembling the multichannel magnetic head units on an appropriate assembling fixture, by positioning and bonding in the following sequence:

i. one sheet 50B (elements 51B and 52B) into which is imbricated six strips of mylar patterns (elements 51I and 52I) for plane 5, ii. one sheet 40B (elements 41B and 42B) for plane 4, iii. one sheet 30G (elements 31B and 32B) for plane 3, iv. one set of magnetic heads, v. one sheet 30D (elements 31B and 32B) for plane 3, vi. one sheet 40B (elements 41B and 42B) for plane 4, and vii. one sheet 50B, as described above, for plane 5.

The set of magnetic heads and all of the sheets, except the symmetrical sheets 50B, are oriented relative to the general axis of symmetry 6 to have the half-heads B turned toward the rear.

Following this assemblage, the process continues by positioning in sequence a sheet 40B, a sheet 30D, a set of magnetic heads, a sheet 30G and a sheet 40B, these sheets and this magnetic heads set being oriented such that the half-heads B are turned toward the front. After the positioning of a new completing sheet 50B (plane 5), the assembling continues in the same manner, while observing the alternate orientation of the half-heads B toward the rear and toward the front, until there has been assembled all of the elements for forming the number of channels desired. The operation is terminated by compression under heat between two plates in order to assure a uniform thickness for all of the laminations realized by the above-mentioned process.

Next follows several machining operations. Through saw cuts which are made perpendicular to the axis of symmetry 6 (FIGS. 10 –12) the laminations are separated into 17 modules, each having a set of six head elements. Each module is milled on the face corresponding to a face of the air gap and on the opposed face, but is not milled on the ends of the elements 33BG and 33BD which form soldering tabs 35G and 35D, FIG. 6.

Further operations of sawing provide for separating, in each module, the six front portions 15 from the six rear portions 16 of the multichannel magnetic head units. Some surfaces, especially the surfaces of the air gap, are smoothed, ground and polished at the required times.

Before the final mounting into the head support, it is necessary to remove the cement, as well as the ends of certain elements, which remains between the soldering tabs 35G and 35D of the magnetic heads, in order to permit easier soldering of wires connecting to the coils on the tabs.

Finally, at the time of mounting in the flying shoe, the front and rear portions of the multichannel head unit are mounted either without relative displacement, to obtain the first embodiment of FIG. 2, or with relative displacement, to obtain the second embodiment of FIG. 2, or with relative displacement to obtain the second embodiment of FIG. 4, according to the application required.

Each of the two embodiments described provides respective advantages. In the first embodiment, the head units provide for writing or reading of recorded information on a number, X, of very closely spaced tracks, for example, with a spacing of 0.508 mm, and this is provided simultaneously, without displacement of the head flying shoe.

In the second embodiment, for a similar size head unit, the number of channels is reduced by half and the head spacing is twice that of the first embodiment. This requires the displacement of the head flying shoe between two transducing operations. On the other hand, the fact that the two coils of each head can be connected in series is evidenced, at the time of reading, by a greater output voltage, and for the operation of writing, by a simplification of the selection switching due to the presence of a central connection between the two coils.

The number of planes constituting the heads and their shields which have been described above is not imperative and may vary, possibly by increasing. Similarly, the representations of the nature of the materials utilized are also not imperative. In particular, mumetal can be employed in lieu of bronze for the material of the metallic shield elements of separation (plane 5).

Since the transverse section of each of portions 15 and 16 of a unit may be equal to or less than 4 mm × 4 without accounting for the soldering tabs, it is clear that the process of fabrication which has been described herein provides for the economical fabrication of a certain number of multichannel magnetic head units, despite the smallness and the composite characteristic of the elements of which they are constituted. This results from the fact that the fabrication and machining operations involve either a large number of head units or a relatively large number of channels of magnetic head units.

Much that has been described in the foregoing and that is represented on the drawing is characteristic of the invention. It is evident that one skilled in the art is able to adduce all modifications of form and of detail using his judgment, without departing from the scope of the invention.

We claim:

1. A multichannel magnetic head unit wherein the heads are stacked one beside the other to correspond to the parallel or concentric tracks of a movable magnetizable medium, each head comprising first and second half-heads between which is provided an air gap, each half-head being formed of a stack of sheets of various materials bonded together and arranged parallel to the direction of the tracks, wherein in each of said heads said sheets of the half-heads comprise a plurality of planes having substantially identical outlines, a plurality of said planes comprising two portions of the same thickness but of different materials, each of said first half-heads comprising, starting from a central axis of symmetry, a first plane having a magnetic circuit portion of magnetic metal and a shield portion of conductive metal, a second plane disposed on each side of said first plane and having a magnetic circuit portion of magnetic metal and a portion of insulating material, a third plane disposed on the outside of each second plane and having two portions of conductive metal, one portion of each of said third planes serving as a soldering plate for a lead of said coil, and a fourth plane disposed on the outside of each of said third planes and consisting of a shield portion of conductive metal, a first type of said planes comprising a ferromagnetic portion and a conductive shield portion and a second type of said planes comprising a ferromagnetic portion and an insulating portion, and wherein in at least said first half-heads of each head said ferromagnetic portion of three of said planes comprises a branch defining means for receiving a transducer coil.

2. The unit of claim 1, further comprising a separation shield plane between adjacent magnetic heads, said shield plane comprising a conductive metal portion and an insulating portion.

3. The unit of claim 2, wherein said first and second half-heads are held in place in a flying shoe on each side of a planar air gap, and wherein two of said first half-heads, each comprising a transducer coil, are disposed in alignment on both sides of said air gap for forming a channel, wherein said second half-heads comprise magnetic elements without coils, and wherein two of said second half-heads are disposed in alignment on both sides of said air gap thereby providing an intermediary electric and magnetic shield.

4. The unit of claim 2 wherein, in each magnetic head, said second half-head comprises a magnetic element without a coil, disposed to close a magnetic circuit including the magnetic structure of said first half-head.

5. The unit of claim 4, wherein said first and second half-heads are held in place in a flying shoe on each side of a planar air gap, and wherein only said first half-heads comprise a transducer coil and are disposed alternately on each side of said air gap, each forming a channel.

6. A multichannel magnetic head unit wherein a plurality of head elements are stacked one beside the other to correspond to parallel or concentric tracks of a movable magnetizable medium, each head unit element comprising first and second half-head elements between which is provided an air gap, each half head element including half-shield members and a half-head proper which comprises a plurality of bonded together planes having substantially rectangular identical outlines, at least certain of said half-head planes comprising two portions of the same thickness but of different materials, each of said first half-head elements comprising, staring from a central axis of symmetry and on each side thereof, a first plane having a magnetic circuit portion of magnetic metal and a shield portion of conductive metal, a second plane having a magnetic circuit portion of magnetic metal and a portion of insulating material, a third plane having two portions of conductive metal, one portion of each of said third planes serving as a soldering plate for a lead of said coil, and a fourth plane consisting of a shield portion of conductive metal, a first type of said planes comprising a ferromagnetic portion and a conductive shield portion and a second type of said planes comprising a ferromagnetic portion and an insulating portion, said half-shield members comprising each at least a metal plane whose outline is identical with that of said half-head planes, and wherein in at least one of said half-head elements said ferromagnetic portion in at least three of said planes comprise a branch defining means for receiving a transducer coil.

7. The unit of claim 6, further comprising a separation shield plane between each pair of adjacent half-head elements, said shield plane comprising a conductive metal portion and an insulating portion.

8. The unit of claim 7, wherein in each head element, said second half-head element comprises a magnetic planar element without a coil, disposed to close a magnetic circuit including the magnetic structure of the corresponding one of said first half-head elements.

* * * * *